Figure 1:
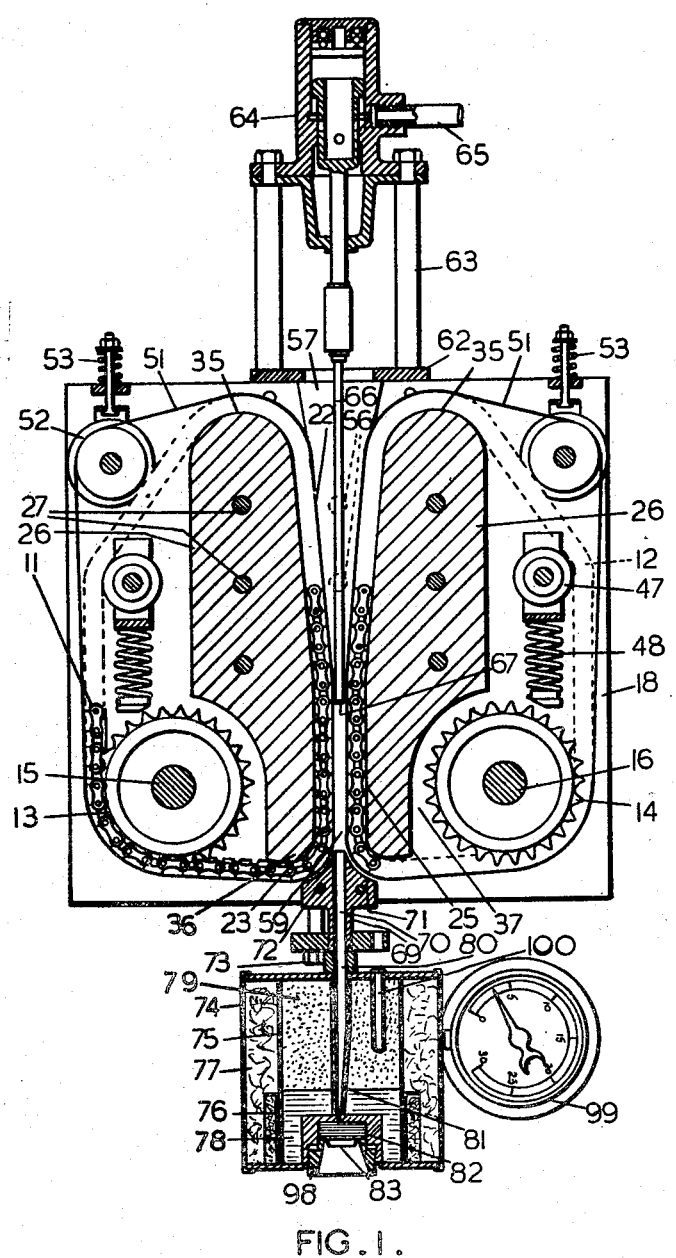

Nov. 3, 1953 E. J. UPTON 2,657,428
EXTRUSION OF FILAMENT-FORMING MATERIALS
Filed Sept. 10, 1949 3 Sheets-Sheet 1

Inventor
E. J. UPTON

Attorneys

Nov. 3, 1953  E. J. UPTON  2,657,428
EXTRUSION OF FILAMENT-FORMING MATERIALS
Filed Sept. 10, 1949  3 Sheets-Sheet 2
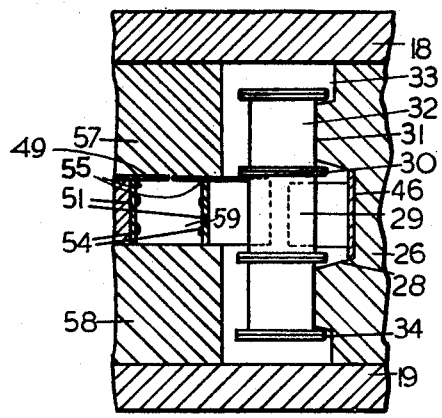
FIG. 3.
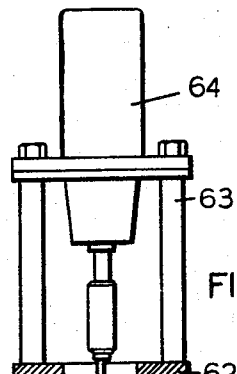
FIG. 2.
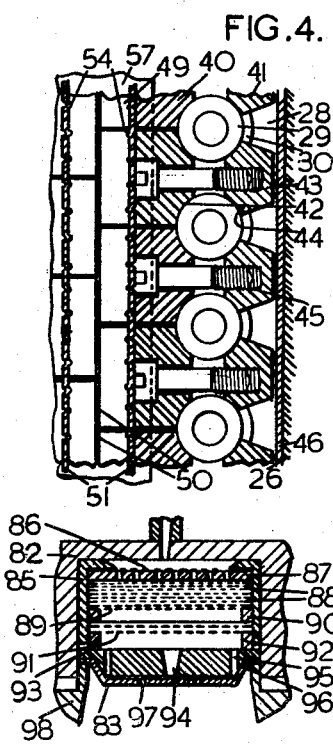
FIG. 4.
FIG. 5.
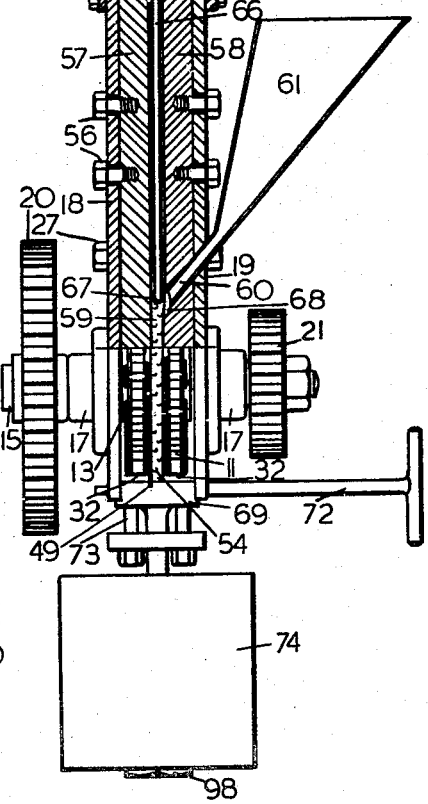
Inventor
E. J. UPTON
Attorneys Nov. 3, 1953  E. J. UPTON  2,657,428
EXTRUSION OF FILAMENT-FORMING MATERIALS
Filed Sept. 10, 1949  3 Sheets-Sheet 3

Inventor
E. J. UPTON
by
Attorneys

UNITED STATES PATENT OFFICE 2,657,428

EXTRUSION OF FILAMENT-FORMING MATERIALS

Edward James Upton, Spondon, near Derby, England, assignor to British Celanese Limited, a corporation of Great Britain Application September 10, 1949, Serial No. 115,035
Claims priority, application Great Britain
October 1, 1948

27 Claims. (Cl. 18—8)

This invention relates to the extrusion of filament-forming materials, and particularly to a method and apparatus for extruding powdered or granular fusible filament-forming materials, e. g., for the melt-spinning of continuous artificial filaments or like products.

According to the present invention a method of extruding powdered or granular fusible filament-forming material comprises feeding the material into a zone laterally bounded by moving surfaces which lie parallel to their direction of motion, and compacting the material in said zone so as to form it into a coherent rod and to force it into frictional engagement with said surfaces whereby said rod is advanced with said surfaces. The advancing rod can be received, as it leaves the surfaces, into a laterally confined space leading to one or more extrusion orifices, the end of the rod being melted in said confined space whereby the molten material is extruded through said orifices by the pressure of the advancing rod. By this method, the powdered or granular material is compacted under pressure into a parallel-sided coherent rod the end of which can be forced, by longitudinal pressure transmitted through a laterally unsupported part of the length of said rod, into and through the laterally confined space leading to the extrusion orifice, in which space the end of the rod is heated so that the material is extruded under said longitudinal pressure through said orifice.

In this way the material can be extruded at a substantially constant volumetric rate and can be maintained in a cool condition until the moment when it enters the extrusion head, very shortly before being extruded. Furthermore the forming of the material into a rod compacted from a supply of granular material gives very desirable results, apparently because the rod possesses some degree of porosity which enables small quantities of gas that may develop in the material to escape through the body of the rod so that they do not interfere with or interrupt the extrusion process.

An apparatus for carrying out the method defined above comprises two endless flexible members arranged to travel through a zone in which they present to each other opposed continuous surfaces each parallel to a common centre-line, means for rigidly supporting said members behind said parallel surfaces, means for feeding the material into the space between said members and for compacting it into a rod between said parallel surfaces and means for driving said members so as to forward the compacted rod. A heated extrusion head is arranged to receive the compacted rod as it leaves the flexible members and to melt said rod, said extrusion head being formed with one or more extrusion orifices through which the molten material is forced by the pressure of the advancing rod. A clearance can be provided between the mouth of the channel leading to the extrusion head and the moving flexible members, the gap being bridged by the compacted rod which, though laterally unsupported, is of sufficient rigidity to transmit the pressure necessary to force the molten material through the extrusion head.

The space between the parallel surfaces constitutes a passage having two moving walls constituted by the parallel surfaces; the remaining walls can be constituted by the surfaces of stationary plates in contact with which the flexible members run, or by shaping or extending the parallel surfaces so that they meet, or by providing more than two flexible members, or by a combination of these expedients. The compacting of the material into a rod while it is in contact with the moving surfaces ensures such frictional engagement between the rod and the moving surfaces that the rod is forwarded with certainty, with a linear speed equal to that of the surfaces.

The compacting of the granular material is preferably effected by means of a tamping rod or like member vibrating longitudinally between the endless flexible members and tamping the granular material into the passage between the parallel surfaces of the members. The vibrating of the tamping rod calls for the application of an alternating force thereto but, in order to produce a true tamping effect, which is an action of inertia or momentum and not a positive pushing action, this force should be independent of the resistance to motion encountered by the rod, and not dependent on such resistance as would be the case if the rod were positively moved to-and-fro over a fixed distance irrespective of the resistance encountered. The application of the necessary force can be effected by a variety of vibrating means, e. g. a pneumatic vibrator.

A convenient form of endless flexible member for the purposes of the present invention comprises a succession of blocks carried by a chain, which blocks, when moving along a straight line, engage one another end-to-end and present a continuous surface but one which is capable of being flexed. Thus, such a series of blocks may be carried by a triple roller chain, i. e. a chain of the bicycle type but having four lines of flat links (instead of two) connected by pins carrying three lines of rollers (instead of a single line) to space the links and to engage the teeth of sprockets over which the chain runs. The blocks are carried between successive rollers in the middle line of the chain and the chain is driven by a pair of sprockets on a common shaft engaging the two outer lines of rollers of the chain. The blocks of such a chain can be supported from behind by means of a guide surface against which the undersides of the blocks run. In addition, the outer lines of rollers of the chain can be supported, where they are not passing round a sprocket, by a similar guide surface. In order to avoid any possibility of interstices appearing in the parallel surfaces of a pair of flexible members of this kind, each series of blocks can be augmented by an endless metal tape covering the outer surfaces of the blocks.

While the invention is particularly applicable to the melt-spinning of fusible filament-forming materials, i. e. the extrusion of the materials in a molten state to form continuous artificial filaments suitable for textile use, it may also be applied to other extrusion processes, e. g. to the extrusion moulding of rods, tubes and other products of substantial cross-section, or even to injection moulding.

Figure 6:
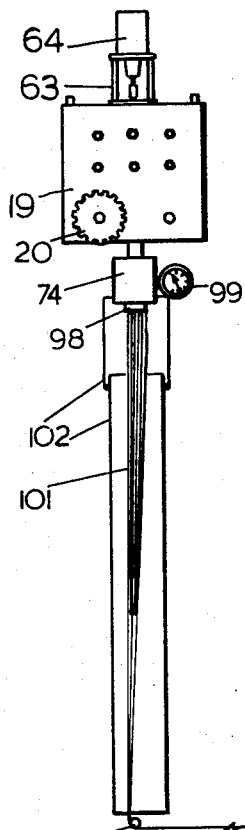
Figure 7:
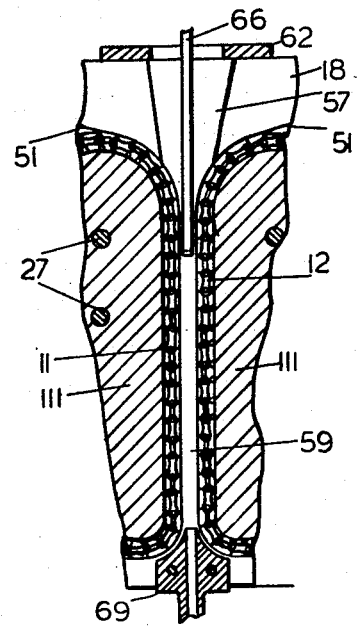
Figure 8:
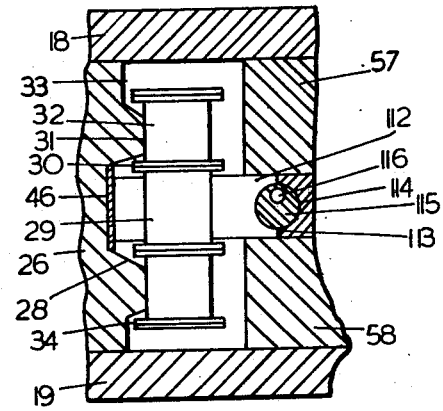

By way of example some forms of melt-spinning apparatus in accordance with the invention will now be described in greater detail with reference to the accompanying drawings in which, Figure 1 is a sectional front elevation of the apparatus, Figure 2 is a side elevation partly in section of the apparatus shown in Figure 1, Figure 3 is a sectional plan of a detail, on an enlarged scale, Figures 4 and 5 are details on an enlarged scale of Figure 1, Figure 6 is a diagrammatic front elevation of the apparatus assembled for use, Figure 7 is a fragmentary sectional view showing an alternative detail of the apparatus shown in Figure 1, and Figure 8 is a view similar to Figure 3 of a further alternative detail.

The apparatus comprises a pair of endless triple roller chains 11, 12 each driven by a pair of sprockets 13, 14, each pair being on a common shaft 15, 16 carried in bearings 17 on two parallel square frame plates 18, 19 each disposed in a vertical plane. The shaft 15 is driven by means of a driving gear 20, and the shafts 15, 16 are synchronised by a train of gears of which one is shown at 21. The operative runs of the two chains 11, 12 are approximately vertical, close to the middle line of the two plates 18, 19 and one on each side thereof, the chains running downwards and converging slightly over the upper half 22 of said runs, and being strictly parallel to one another over the lower half 23. The two pairs of sprockets 13, 14 are disposed close to the two lower corners of the two plates 18, 19 and each chain is guided in its operative run by the edge 25 of a guide plate 26, the two guide plates 26 being secured between the frame plates by means of through-bolts 27 so as to space the frame plates apart by a distance slightly exceeding the width of each chain 11, 12. Along the working edge 25 of the guide plate 26, as shown in Figures 3 and 4, extends a deep groove 28, wide enough to accommodate the middle line of rollers 29 of the chain and the adjoining flat links 30, and on each side of the groove 28 the edges of the guide plate at 31 are engaged by the rollers 32 of the two outer lines of the chain. The working edges 25 are also cut away or chamfered at 33 where they adjoin the faces of the frame plates 18, 19, to accommodate the outer lines of links 34 of the chain. The upper edge 35 of each plate 26 is approximately semi-circular and the lower edge 36 is in the form of a quadrant, the lower and outer corners of the two guide plates being cut away at 37 to accommodate the two pairs of sprockets 13, 14.

Carried by the middle lines of rollers 29 of each chain 11, 12 is a series of pairs of blocks 40, 41, each of a width approximately equal to the length of the rollers 29. The blocks 40 on the outer side of the chain are rectangular in the section perpendicular to the rollers 29, except where they are cut away at 42 to fit to the surfaces of the two rollers 29 between which they are carried. The length of the blocks 40 is exactly equal to the pitch of the chain. The inner blocks 41 are of less length and are, moreover, tapered towards their bases 43; these blocks are also shaped, at 44 to fit to the surfaces of the rollers 29. The tapering of the inner blocks 41 permits the chains 11, 12 to flex towards the inner side thereof. Each outer block 40 is centrally bored and counter-bored for the passage of a cheese-headed screw 45 which is screwed into the corresponding inner block 41, the screw passing through the space between adjacent rollers 29 of the chain and nipping the inner and outer blocks 40, 41 lightly against the rollers. The bases 43 of the inner blocks bear against a phosphor bronze strip 46 in the bottom of the groove 28 formed in the edge 25 of the guide plate 26, so that the chain 11 or 12 is supported by joint action of this strip, and the edge portions 31 of the guide plate 26 which support the outer rollers 32 of the chain. Each chain 11, 12 is lightly tensioned by a pair of jockey rollers 47 (Figure 1) engaging the rollers 32 and loaded by a spring 48 so as to be urged upwards. The jockey rollers 47 are carried between the frame plates 18, 19 of the apparatus a short distance above the pairs of sprockets 13, 14.

On one side of each outer block 40 is secured a rectangular strip 49 of sheet steel extending beyond the face of the block and of the same length as the block, the strips projecting beyond the faces of the blocks to such a distance that the outer edges 50 of the strips on the two chains 11, 12 come into contact with one another when the chains are nearest to one another, and parallel, in the course of their operative run.

Completely encircling each chain 11, 12 is a continuous steel band 51 covering the faces of the outer blocks 40 over the whole of the operative run of the chain, and held in contact therewith by a jockey pulley 52, which is carried between the frame plates 18, 19 near the upper corner thereof and is loaded by means of a spring 53 so as to be urged upwards. The backs of the bands 51 are punched so as to form small protrusions 54 on the face of the bands. One edge 55 (Figure 3) of each band makes contact with the faces of the successive strips of steel 49 secured to the outer blocks 40.

Secured to each frame plate 18, 19 by screws 56 and extending down the middle line thereof is a polished steel cheek plate 57, 58, the cheek plate 57 on the frame plate 18 bearing against the backs of the strips 49 secured to the outer blocks 40, while the other cheek plate 58 bears against the blocks 40 themselves on the other side, both plates 57, 58 being of such profile as to clear the links of the chains 11, 12 themselves. The second cheek plate 58 forms the fourth and stationary side of a passage 59 of rectangular section, of which the opposite side is constituted by the strips 49 secured to the other sides of the outer blocks 40, while the adjoining sides are constituted by the continuous bands 51 covering the faces of the blocks 40. The second cheek plate 58 is formed with an oblique channel 60 entering the rectangular passage 59 just below the point where the continuous bands 51 enter their parallel run, the channel extending through the adjoining frame plate 19 and communicating with a hopper 61 for the supply of powdered or granular material. The passage 59, as shown in Figure 3, is of square cross-section. The passage may, however, be of other rectangular section, the width of the bands 51 being preferably greater than the distance between them. In this case, the strips 49 can be omitted, the cheek plate 57, like the cheek plate 58, forming a stationary side for the passage 59.

Secured to the top of the two frame plates 18, 19 by a bracket 62 and pillars 63 is a pneumatic vibrator 64, e. g. of the kind used for the agitation of mould boxes in foundry work, supplied with compressed air by a pipe 65. Depending from the vibrator is a vertical rod 66 of a rectangular section substantially equal to that of the passage 59, the end 67 of which rod enters the passage 59 between the parallel portions 23 of the bands 51. At the middle of its vertical stroke the end of the rod is just above the middle of the mouth 68 of the channel 60 for the supply of material. The end 67 of the rod 66 is cut at an angle of about 10° to the horizontal, the lowest portion being adjacent to the cheek plate 57.

Secured to the lower edges of the frame plates 18, 19 is a guide member 69 presenting a passage 70 of rectangular section substantially equal to the section of the passage 59 between the bands 51. The guide member 69 is shaped at 71 to accommodate the bands as they pass round the quadrants 36, so that the mouth of the passage 70 can be brought quite close to the point where the continuous bands 51 begin to diverge, though leaving a clearance which is bridged by the laterally unsupported rod of material formed in the passage 59. The guide member 69 is secured between the two plates 18, 19 by means of taper pins 72 passing through the plates 18, 19 and through the guide member 69.

To the bottom of the guide member 69 is fixed by means of bolts 73, an extrusion head 74 comprising a cylindrical boiler 75 having electrical windings 76 round the lower part thereof and having its side walls adequately lagged at 77. The boiler contains a liquid 78 (such as diphenyl, or diphenyl oxide, or an azeotropic mixture thereof) and its vapour 79, the liquid 78 having a boiling point, at some convenient super-atmospheric pressure, equal to the temperature required for melting the material. The boiler-space containing the liquid is annular, and through the axis of the boiler extends a rectangular passage 80 forming a continuation of the rectangular passage 70 in the guide member 69. Within the boiler, however, and in the lower part of the passage 80, one of its sides 81 slopes towards the opposite side so that the section of the passage diminishes towards the end. The converging portion of the passage 80 constitutes a melt chamber, communicating with a filter 82 (Figures 1 and 5) leading to a spinning jet 83 secured to the bottom of the middle wall of the boiler.

The filter 82 and jet 83 are shown in greater detail in Figure 5. A stainless steel casing 85 contains one 300 mesh Phosphor bronze gauze 86, a perforated plate 87, 6 more 300 mesh gauzes 88, and two stainless steel gauzes 89 of 200 mesh, all secured by a locking ring 90. Two more stainless steel gauzes 91 of 60 mesh are secured by a further locking ring 92. If desired, one or more layers of sand, e. g. of a fineness of 60/30 mesh may be included in the filter assembly, each layer filling a space left between two gauzes, as between the gauzes 89, 91. Beneath the filter is a solid stainless steel jet-adapter 93, shaped to occupy the interior of the stainless steel jet 83. The adapter 93 has a central hole 94 tapering from $\frac{1}{8}''$ to $\frac{1}{16}''$, and eleven peripheral holes 95 of $\frac{1}{16}''$ diameter which break through the sloping sides 96 of the adapter. This arrangement gives a two-way radial flow of molten material to the circle of jet orifices 97, and prevents stagnation of the molten material in dead spaces in the jet 83. The jet 83, adapter 93 and filter 82 are secured in the middle space of the boiler 75 by means of a threaded member 98 (Figures 1 and 5). A pressure gauge 99 and a temperature pocket 100 communicate with the annular space inside the boiler 75. Associated with the pressure gauge 99 are conventional control means (not shown) whereby, by controlling the current supply to the heater windings 76, the pressure in the boiler 75, and therefore its temperature, are kept substantially constant.

The arrangement of the apparatus for operation is shown in Figure 6. In the operation of the apparatus, powdered or granular material is fed to the hopper 61 and is tamped into a compacted rod of rectangular section in the rigidly confined space of the passage 59 between the endless bands 51. The compacted rod is carried downwards by the bands 51 and forced into the mouth of the rectangular passage 70 in the guide member 69. The friction between the freshly compacted rod and the bands 51 between which it is contained is considerable, and is augmented by the protrusions 54, so that the movement of the bands, and of the strips 49, is sufficient to force the compacted rod into the melt chamber where it is fused as it comes into contact with the wall 81 and the opposite wall of the converging passage 80 constituting the melt chamber. The pressure of the incoming rod forces the fused material through the filter 82 and through the spinning jet 83 in the form of filaments 101. The filaments 101 pass down an open tube 102, by which they are protected from irregular air currents, and in which they set by cooling after they have left the spinning jet 83. At the bottom of the tube 102, the filaments pass round a guide 103, and are collected and wound in the usual manner by means of a winding device indicated diagrammatically at 104.

In starting up the apparatus, the guide 69 and extrusion head 74 are removed and a steel rod of appropriate section is inserted up the passage 59 from below and held in position while the first granular material is fed through the hopper 61. Once the compacting of the material against the end of the steel rod has been established the steel rod, which is forced out of the channel 59 by the advancing rod of material, becomes unnecessary. After a few inches of compacted powder have been formed they are broken off (not being of good quality) and the machine is ready for the attachment of the extrusion head 74 and guide 69, and for the commencement of spinning.

The arrangement shown in Figures 1-5 is designed to allow material to be fed to the apparatus by an alternative method. Instead of feeding the powdered material to the hopper 61, it may be fed directly into the converging space at 22 between the bands 51, the bands themselves, together with the cheek plates 57, 58 constituting a feeding hopper. The tip of the tamping rod 66 is shortened so that, at the top of its stroke, it emerges from the parallel portion between the bands 51 at 22 and allows a small quantity of the powdered material to enter. If it is not required to be able to feed the material in this manner the apparatus shown in Figure 1 may be modified in the manner indicated in Fig. 7, in which, in place of the guide plates 26 there are provided guide plates 111 which are without the converging portions at 22. The inner edges of the guide plates 111 are parallel over the whole of their length and are shorter than the plates 26 shown in Figure 1. The tamping rod 66 is correspondingly shorter, and its lower end 67 is disposed higher between the side plates 111 than is indicated in Figure 1.

Figure 8 shows an alternative arrangement in which the bands 51 are omitted and in place of the blocks 40 differently shaped blocks 112 are employed, the opposing faces of the two series of blocks 112 meeting at their margins 113 and being formed with semi-cylindrical recesses 114 which register with one another to constitute a cylindrical passage in which the material is compacted into a rod. The tamping rod 115 employed in Figure 8 is circular in cross section and is provided with a passage 116 eccentric to the rod and extending along its length, the powdered material being fed into the cylindrical space between the blocks 112 through this passage. In the course of operation, the tamping rod 115 is slowly rotated as well as being longitudinally vibrated by the vibrator 64, so that the whole circular area of the passage between the blocks 112 is subjected to the tamping action on account of the eccentricity of the passage 116. The guide member 69 will, of course, be modified to present a passage of circular section for the reception of the cylindrical rod formed.

The invention is particularly adapted for the extrusion of organic filament-forming materials that are liable to decompose at temperatures at or only slightly above their melting points, e. g. the synthetic linear polyamides, made for example by condensing of diamines with dicarboxylic acids, or the synthetic polyaminotriazoles (such as poly-octa-methylene polyaminotriazole) made for example as described in U. S. application S. No. 662,623, filed April 16, 1946, now Patent No. 2,512,600, and U. S. application S. No. 609,031, filed August 4, 1945, now Patent No. 2,512,667, or co-polymers of polyamides and polyaminotriazoles made, for example, as described in U. S. application S. No. 726,964, filed February 6, 1947, now Patent No. 2,512,627. The invention may also be applied, however, to the spinning of other fusible filament-forming materials, e. g. polyvinyl compounds such as polyvinylidene chloride and co-polymers of vinyl chloride with vinyl acetate or acrylonitrile.

Having described my invention, what I desire to secure by Letters Patent is:

1. A method of extruding fusible filament-forming material, said method comprising feeding the material in powdered or granular form into a zone laterally bounded by moving surfaces which lie parallel to their direction of motion, compacting the material in said zone so as to form it into a coherent rod and to force it into frictional engagement with said surfaces whereby said rod is advanced with said surfaces, receiving the advancing rod as it leaves said surfaces in a laterally confined space leading to at least one extrusion orifice, and melting the end of said rod in said confined space whereby the molten material is extruded through said orifice by the pressure of the advancing rod.

2. A method of extruding fusible filament-forming material, said method comprising feeding the material in powdered or granular form through an aperture in a stationary boundary of a zone which is laterally bounded by moving and stationary surfaces all of which lie parallel to the direction of motion of the moving surfaces, compacting the material in said zone so as to form it into a coherent rod and to force it into frictional engagement with said surfaces whereby said rod is advanced with said moving surfaces, receiving the advancing rod as it leaves said surfaces in a laterally confined space leading to at least one extrusion orifice, and melting the end of said rod in said confined space whereby the molten material is extruded through said orifice by the pressure of the advancing rod.

3. A method of extruding fusible filament-forming material, said method comprising feeding the material in powdered or granular form through an aperture in a stationary boundary of a zone laterally bounded by moving and stationary surfaces all of which lie parallel to the direction of motion of the moving surfaces, subjecting the material in said zone to an intermittent tamping pressure applied in the direction of motion of said surfaces so as to form the powdered or granular material into a coherent rod and to force it into frictional engagement with said surfaces whereby said rod is advanced with said surfaces, receiving the advancing rod as it leaves said surfaces in a laterally confined space leading to at least one extrusion orifice, and melting the end of said rod in said confined space whereby the molten material is extruded through said orifice by the pressure of the advancing rod.

4. Apparatus for the melt spinning of fusible filament-forming material supplied in powdered or granular form, said apparatus comprising two endless flexible members arranged to travel through a zone in which they present to each other opposed continuous surfaces each parallel to a common centre line, means for rigidly supporting said members behind said parallel surfaces, means for feeding the powdered or granular material into the space between said members and for compacting it into a rod between said parallel surfaces, means for driving said members so as to forward the compacting rod, and a heated extrusion head adapted to receive the compacted rod and to melt said rod, said extrusion head being formed with at least one extrusion orifice, through which the molten material is forced by the pressure of the advancing rod.

5. Apparatus for the melt-spinning of fusible filament-forming material supplied in powdered or granular form, said apparatus comprising two endless flexible members arranged to travel through a zone in which they present to each other opposed continuous surfaces each parallel to a common centre line, means for rigidly supporting said members behind said parallel surfaces, means for feeding the powdered or granular material into the space between said members and for compacting it into a rod between said parallel surfaces, a heated extrusion head, a guide member having a channel leading into said extrusion head but spaced from said flexible member so as to leave a gap that is bridged by the laterally unsupported rod, and means for driving said flexible members so as to forward the compacted rod through said channel into said extrusion head, said extrusion head being adapted to melt said rod and being formed with at least one extrusion orifice, through which the molten material is forced by the pressure of the advancing rod.

6. Apparatus for the melt-spinning of fusible filament-forming material supplied in powdered or granular form, said apparatus comprising two endless flexible members arranged to travel through a zone in which they present to each other opposed continuous surfaces each parallel to a common centre line, means for rigidly supporting said members behind said parallel surfaces, means for feeding the powdered or granular material into the space between said members and for compacting it into a rod between said parallel surface, a heated extrusion head, a guide member having a channel leading into said extrusion head and shaped to fit the conformation of the flexible members, said guide member extending close to the parallel portions of said members but being spaced therefrom so as to leave a gap that is bridged by the laterally unsupported compacted rod, and means for driving said flexible members so as to forward the compacted rod through said channel into said extrusion head, said extrusion head being adapted to melt said rod and being formed with at least one extrusion orifice, through which the molten material is forced by the pressure of the advancing rod.

7. Apparatus for the melt-spinning of fusible filament-forming material supplied in powdered or granular form, said apparatus comprising two endless flexible members arranged to travel through a zone in which they present to each other opposed continuous surfaces each parallel to a common centre line and extending the whole length of said zone, means for rigidly supporting said members behind said parallel surfaces, a tamping rod adapted to enter the space between said parallel surfaces, a vibrator for applying longitudinally to said rod an alternating force independent of the resistance to motion encountered by said rod so as to vibrate said rod longitudinally and thereby to tamp into a rod between said parallel surfaces particles of said fusible filament-forming powdered material fed into said space, means for driving said flexible members so as to forward the compacted rod, and means for receiving said compacted rod, said latter means including means for melting said rod and means for shaping said molten material, the molten material being forced through said shaping means by the pressure of the advancing rod.

8. Apparatus for the melt-spinning of fusible filament-forming material supplied in powdered or granular form, said apparatus comprising two endless flexible members arranged to travel through a zone in which they present to each other opposed continuous surfaces each parallel to a common centre line and extending the whole length of said zone, means for rigidly supporting said members behind said parallel surfaces, at least one stationary member presenting a surface parallel to said centre line and adapted to co-operate with said opposed surfaces to constitute a passage, said stationary member being formed with an aperture extending through said surface into said passage for feeding powdered or granular material into said passage, a tamping rod adapted to enter said passage, a vibrator for applying longitudinally to said rod an alternating force independent of the resistance to motion encountered by said rod so as to vibrate said rod longitudinally and thereby to tamp into a rod the material fed into said passage, said tamping rod and vibrator being constructed and arranged to apply the tamping rod to substantially the whole end surface of the material in said passage, means for driving said flexible members so as to forward the compacted rod, and means for receiving said compacted rod, said latter means including means for melting said rod and means for shaping said molten material, the molten material being forced through said shaping means by the pressure of the advancing rod.

9. Apparatus for the melt-spinning of fusible filament-forming material supplied in powdered or granular form, said apparatus comprising two endless flexible members arranged to travel through a zone in which they present to each other opposed continuous surfaces each parallel to a common centre line, means for rigidly supporting said members behind said parallel surfaces, a tamping rod adapted to enter the space between said parallel surfaces, means for vibrating said rod longitudinally so as to compact into a rod between said parallel surfaces powdered material fed into said space, means for driving said flexible members so as to forward the compacted rod and a heated extrusion head adapted to receive the compacted rod and to melt said rod, said extrusion head being formed with at least one extrusion orifice, through which the molten material is forced by the pressure of the advancing rod.

10. Apparatus for the melt-spinning of fusible filament-forming material supplied in powdered or granular form, said apparatus comprising two endless flexible members arranged to travel through a zone in which they present to each other opposed continuous surfaces each parallel to a common centre line, means for rigidly supporting said members behind said parallel surfaces, a tamping rod adapted to enter the space between said parallel surfaces, means for vibrating said rod longitudinally so as to compact into a rod between said parallel surfaces powdered material fed into said space, a heated extrusion head, a guide member having a channel leading into said extrusion head but spaced from said flexible members so as to leave a gap that is bridged by the laterally unsupported compacted rod, and means for driving said flexible members so as to forward the compacted rod through said channel into said extrusion head, said extrusion head being adapted to melt said rod and being formed with at least one extrusion orifice, through which the molten material is forced by the pressure of the advancing rod.

11. Apparatus for the melt-spinning of fusible filament-forming material supplied in powdered or granular form, said apparatus comprising two endless flexible members arranged to travel through a zone in which they present to each other opposed continuous surfaces each parallel to a common centre line, means for rigidly supporting said members behind said parallel surfaces, a tamping rod adapted to enter the space between said parallel surfaces, means for vibrating said rod longitudinally so as to compact into a rod between said parallel surfaces powdered material fed into said space, a heated extrusion head, a guide member having a channel leading into said extrusion head and shaped to fit the conformation of said flexible members, said guide member extending close to the parallel portions of said members but being spaced therefrom so as to leave a gap that is bridged by the laterally unsupported compacted rod, and means for driving said flexible members so as to forward the compacted rod through said channel into said extrusion head, said extrusion head being adapted to melt said rod and being formed with at least one extrusion orifice, through which the molten material is forced by the pressure of the advancing rod.

12. Apparatus for the melt-spinning of fusible filament-forming material supplied in powdered or granular form, said apparatus comprising two endless flexible members arranged to travel through a zone in which they present to each other opposed continuous surfaces each parallel to a common centre line, means for rigidly supporting said members behind said parallel surfaces, at least one stationary member presenting a flat surface parallel to said centre line and adapted to co-operate with said opposed surfaces so to constitute a passage of rectangular section, said stationary member being formed with an aperture extending through said flat surface for feeding powdered or granular material into said passage, a tamping rod adapted to enter said passage, means for vibrating said rod longitudinally so as to compact into a rod the material fed into said passage, a heated extrusion head, a guide member having a channel leading into said extrusion head but spaced from said flexible member so as to leave a gap that is bridged by the laterally unsupported compacted rod, and means for driving said flexible members so as to forward the compacted rod through said channel into said extrusion head, said extrusion head being adapted to melt said rod and being formed with at least one extrusion orifice, through which the molten material is forced by the pressure of the advancing rod.

13. Apparatus for the melt-spinning of fusible filament-forming material supplied in powdered or granular form, said apparatus comprising two endless chains arranged to travel through a zone, a series of blocks carried by each chain and adapted to engage one another end to end so that said series present to each other opposed continuous surfaces each parallel to a common centre line and extending the whole length of said zone, means for rigidly supporting said blocks behind said parallel surfaces, a tamping rod adapted to enter the space between said parallel surfaces, a vibrator for applying longitudinally to said rod an alternating force independent of the resistance to motion encountered by said rod so as to vibrate said rod longitudinally and thereby to tamp into a rod between said parallel surfaces particles of said fusible filament-forming material fed into said space, said tamping rod and vibrator being constructed and arranged to apply the tamping rod to substantially the whole end surface of the material in said passage, means for driving said chains so as to forward the compacted rod, and means for receiving said compacted rod, said latter means including means for melting said rod and means for shaping said molten material, the molten material being forced through said shaping means by the pressure of the advancing rod.

14. Apparatus for the melt-spinning of fusible filament-forming material supplied in powdered or granular form, said apparatus comprising two endless chains, a series of blocks carried by each chain and adapted to engage one another end to end so that said series present to each other opposed continuous surfaces each parallel to a common centre line, means for rigidly supporting said blocks behind said parallel surfaces, a tamping rod adapted to enter the space between said parallel surfaces, means for vibrating said rod longitudinally so as to compact into a rod between said parallel surfaces powdered material fed into said space, means for driving said chains so as to forward the compacted rod and a heated extrusion head adapted to receive the compacted rod and to melt said rod, said extrusion head being formed with at least one extrusion orifice, through which the molten material is forced by the pressure of the advancing rod.

15. Apparatus for the melt-spinning of fusible filament-forming material supplied in powdered or granular form, said apparatus comprising two triple-roller chains, a series of blocks on each chain, clamped to the middle rollers thereof and adapted to engage one another end to end so that said series present to each other opposed continuous surfaces each parallel to a common centre line, means for rigidly supporting said blocks behind said parallel surfaces, a tamping rod adapted to enter the space between said parallel surfaces, means for vibrating said rod longitudinally so as to compact into a rod between said parallel surfaces powdered material fed into said space, two pairs of sprockets for engaging the outer rollers of each of said chains and for driving said chains so as to forward the compacted rod, and a heated extrusion head adapted to receive the compacted rod and to melt said rod, said extrusion head being formed with at least one extrusion orifice, through which the molten material is forced by the pressure of the advancing rod.

16. Apparatus for the melt-spinning of fusible filament-forming material supplied in powdered or granular form, said apparatus comprising two endless chains, a series of blocks carried by each chain and adapted to engage one another end to end so that said series present to each other opposed continuous surfaces each parallel to a common centre line, means for rigidly supporting said blocks behind said parallel surfaces, plates fixed to the sides of said blocks and extending beyond the faces thereof so as to constitute at least a third wall for the space between said parallel surfaces, means for feeding the powdered or granular material into said space and for compacting it into a rod therein, means for driving said chains so as to forward the compacting rod, and a heated extrusion head adapted to receive the compacted rod and to melt said rod, said extrusion head being formed with at least one extrusion orifice, through which the molten material is forced by the pressure of the advancing rod.

17. Apparatus for the melt-spinning of fusible filament-forming material supplied in powdered or granular form, said apparatus comprising two endless chains, a series of blocks carried by each chain and adapted to engage one another end to end so that said series present to each other opposed continuous surfaces each parallel to a common centre line, means for rigidly supporting said blocks behind said parallel surfaces, plates fixed to the sides of said blocks and extending beyond the faces thereof so as to constitute a third wall for a passage of rectangular cross-section between said parallel surfaces, a stationary member presenting a flat surface constituting the fourth wall of said passage, said stationary member being formed with an aperture extending through said flat surface for feeding powdered or granular material into said passage, a tamping rod adapted to enter said passage, means for vibrating said rod longitudinally so as to compact into a rod the material fed into said passage, and means for driving said chains so as to forward the compacted rod.

18. Apparatus for the melt-spinning of fusible filament-forming material supplied in powdered or granular form, said apparatus comprising two endless chains, a series of blocks carried by each chain and adapted to engage one another end to end so that said series present to each other opposed continuous surfaces each parallel to a common centre line, means for rigidly supporting said blocks behind said parallel surfaces, an endless flexible band in association with each series of blocks and adapted to cover the faces of said blocks, means for feeding the powdered or granular material into the space between said bands and for compacting it into a rod therein a heated extrusion head, a guide member having a channel leading into said extrusion head and shaped to fit the conformation of said bands, said guide member extending close to the parallel portions of said bands but being spaced therefrom so as to leave a gap that is bridged by the laterally unsupported compacted rod, and means for driving said chains so as to forward the compacted rod through said channel into said extrusion head, said extrusion head being adapted to melt said rod and being formed with at least one extrusion orifice, through which the molten material is forced by the pressure of the advancing rod.

19. Apparatus for the melt-spinning of fusible filament-forming material supplied in powdered or granular form, said apparatus comprising two endless chains arranged to travel through a zone, a series of blocks carried by each chain and adapted to engage one another end to end so that said series present to each other opposed continuous surfaces each parallel to a common centre line and extending the whole length of said zone, means for rigidly supporting said blocks behind said parallel surfaces, an endless flexible band in association with each series of blocks and adapted to cover the faces of said blocks, a tamping rod adapted to enter the space between said bands, said tamping rod having a cross-section substantially equal to the cross-sectional area of said space, a vibrator for applying longitudinally to said rod an alternating force independent of the resistance to motion encountered by said rod so as to vibrate said rod longitudinally and thereby to tamp into a rod between said bands particles of said fusible filament-forming material fed into said space, means for driving said chains so as to forward the compacted rod, and means for receiving said compacted rod, said latter means including means for melting said rod and means for shaping said molten material, the molten material being forced through said shaping means by the pressure of the advancing rod.

20. Apparatus for the melt-spinning of fusible filament-forming material supplied in powdered or granular form, said apparatus comprising two endless chains, a series of blocks carried by each chain and adapted to engage one another end to end so that said series present to each other opposed continuous surfaces each parallel to a common centre line, means for rigidly supporting said blocks behind said parallel surfaces, an endless flexible band in association with each series of blocks and adapted to cover the faces of said blocks, a tamping rod adapted to enter the space between said bands, means for vibrating said rod longitudinally so as to compact into a rod between said bands powdered material fed into said space, means for driving said chains so as to forward the compacted rod and a heated extrusion head adapted to receive the compacted rod and to melt said rod, said extrusion head being formed with at least one extrusion orifice, through which the molten material is forced by the pressure of the advancing rod.

21. Apparatus for the melt-spinning of fusible filament-forming material supplied in powdered or granular form, said apparatus comprising two triple-roller chains, a series of blocks on each chain, clamped to the middle rollers thereof and adapted to engage one another end to end so that said series present to each other opposed continuous surfaces each parallel to a common centre line, means for rigidly supporting said blocks behind said parallel surfaces, an endless flexible band in association with each series of blocks and adapted to cover the faces of said blocks, a tamping rod adapted to enter the space between said bands, means for vibrating said rod longitudinally so as to compact into a coherent rod between said bands powdered material fed into said space, a heated extrusion head, a guide member having a channel leading into said extrusion head and shaped to fit the conformation of said bands, said guide member extending close to the parallel portions of said bands but being spaced therefrom so as to leave a gap that is bridged by the laterally unsupported compacted rod, and two pairs of sprockets for engaging the outer rollers of each of said chains and for driving said chains so as to forward the compacted rod through said channel into said extrusion head, said extrusion head being adapted to melt said rod and being formed with at least one extrusion orifice, through which the molten material is forced by the pressure of the advancing rod.

22. Apparatus for the melt-spinning of fusible filament-forming material supplied in powdered or granular form, said apparatus comprising two endless chains, a series of blocks carried by each chain and adapted to engage one another end to end so that said series present to each other opposed continuous surfaces each parallel to a common centre line, means for rigidly supporting said blocks behind said parallel surfaces, plates fixed to the sides of said blocks and extending beyond the faces thereof so as to constitute a third wall for a passage of rectangular section between said parallel surfaces, an endless flexible band in association with each series of blocks and adapted to cover the faces of said blocks, a stationary member presenting a flat surface constituting the fourth wall of said passage, said stationary member being formed with an aperture extending through said flat surface for feeding powdered or granular material into said passage, a tamping rod adapted to enter said passage, means for vibrating said rod longitudinally so as to compact into a rod the material fed into said passage, and means for driving said chains so as to forward the compacted rod.

23. Apparatus for the melt-spinning of fusible filament-forming material supplied in powdered or granular form, said apparatus comprising two endless chains, a series of blocks carried by each chain and adapted to engage one another end to end so that said series present to each other opposed continuous surfaces each parallel to a common centre line, means for rigidly supporting said blocks behind said parallel surfaces, an endless flexible band in association with each series of blocks and adapted to cover the faces of said blocks, projections on the faces of said bands, means for feeding the powdered or granular material into the space between said bands and for compacting it into a rod therein, means for driving said chains so as to forward the compacted rod and a heated extrusion head adapted to receive the compacted rod and to melt said rod, said extrusion head being formed with at least one extrusion orifice, through which the molten material is forced by the pressure of the advancing rod.

24. Apparatus for the melt-spinning of fusible filament-forming material supplied in powdered or granular form, said apparatus comprising two endless chains, a series of blocks carried by each chain and adapted to engage one another end to end so that said series present to each other opposed continuous surfaces each parallel to a common centre line, means for rigidly supporting said blocks behind said parallel surfaces, an endless flexible band in association with each series of blocks and adapted to cover the faces of said blocks, projections on the faces of said bands, a tamping rod adapted to enter the space between said bands, means for vibrating said rod longitudinally so as to compact into a rod between said bands powdered material fed into said space, means for driving said chains so as to forward the compacted rod and a heated extrusion head adapted to receive the compacted rod and to melt said rod, said extrusion head being formed with at least one extrusion orifice, through which the molten material is forced by the pressure of the advancing rod.

25. Apparatus for the melt-spinning of fusible filament-forming material supplied in powdered or granular form, said apparatus comprising two triple-roller chains, a series of blocks on each chain, clamped to the middle rollers of said chains and adapted to engage one another end to end so that said series present to each other opposed continuous surfaces each parallel to a common centre line, means for rigidly supporting said blocks behind said parallel surfaces, plates fixed to the sides of said blocks and extending beyond the faces thereof so as to constitute a third wall for a passage of rectangular cross-section between said parallel surfaces, a stationary member presenting a flat surface constituting the fourth wall of said passage, said stationary member being formed with an aperture extending through said flat surface for feeding powdered or granular material into said passage, an endless flexible band in association with each series of blocks and adapted to cover the faces of said blocks, projections on the faces of said bands, a tamping rod adapted to enter the space between said bands, means for vibrating said rod longitudinally so as to compact into a coherent rod between said bands powdered material fed into said space, a heated extrusion head, a guide member having a channel leading into said extrusion head and shaped to fit the conformation of said bands, said guide member extending close to the parallel portions of said bands but being spaced therefrom so as to leave a gap that is bridged by the laterally unsupported compacted rod, and two pairs of sprockets for engaging the outer rollers of each of said chains and for driving said chains so as to forward the compacted rod through said channel into said extrusion head, said extrusion head being formed with at least one extrusion orifice, through which the molten material is forced by the pressure of the advancing rod.

26. A method of extruding fusible filament-forming material, said method comprising tamping powdered or granular material at a temperature substantially below its melting point into a coherent rod by a succession of blows applied to fresh powdered or granular material added at one end of the rod being formed, forcing the other end of said rod, continuously with the formation of the rod, by longitudinal pressure applied in the same direction as said blows and transmitted through a laterally unsupported part of said rod, into a laterally confined space leading to at least one orifice and melting the end of said rod in said space so that the material is extruded under said longitudinal pressure through said orifice.

27. A method of extruding fusible filament-forming material, said method comprising assembling granules of fusible filament-forming material in the form of a rod at a temperature substantially below the melting point of the material, compacting said granules in that form under pressure so as to effect a union of the granules at their mutually contacting surfaces, forcing the end of the compacted rod into a laterally confined space leading to at least one extrusion orifice by longitudinal pressure transmitted through a laterally unsupported part of said rod, and melting the end of said rod in said space so that the molten material is extruded under said longitudinal pressure through said orifice, the degree of union effected by the compacting pressure being sufficient to render said rod resistant to crushing under said longitudinal pressure.

EDWARD JAMES UPTON.

References Cited in the file of this patent

UNITED STATES PATENTS

| Number | Name | Date |
|---|---|---|
| 1,671,079 | McManus | May 22, 1928 |
| 1,680,952 | Muller | Aug. 14, 1928 |
| 1,874,799 | Peiler | Aug. 30, 1932 |
| 2,075,735 | Loomis | Mar. 30, 1937 |
| 2,229,489 | Barnard | Jan. 21, 1941 |
| 2,287,277 | Ryder | June 23, 1942 |
| 2,367,173 | Martin | Jan. 9, 1945 |